United States Patent [19]

Stuhr

[11] Patent Number: 5,000,400
[45] Date of Patent: Mar. 19, 1991

[54] FOUR-POST WING-STOWED MAIN LANDING GEAR FOR HIGH SPEED AIRCRAFT

[75] Inventor: V. Kenneth Stuhr, Seattle, Wash.

[73] Assignee: The Boeing Company, Seattle, Wash.

[21] Appl. No.: 451,196

[22] Filed: Dec. 15, 1989

[51] Int. Cl.$^5$ ............................................. B64C 25/01
[52] U.S. Cl. ................................ 244/102 R; 244/101; 244/103 R
[58] Field of Search ............ 244/100 R, 102 R, 102 A, 244/102 SL, 102 SS, 100 C, 101, 103 R, 39

[56] References Cited

U.S. PATENT DOCUMENTS

| | | | |
|---|---|---|---|
| 1,914,092 | 6/1933 | Henrichsen et al. | 244/103 R |
| 2,896,884 | 7/1959 | Perdue | 244/102 R |
| 3,511,456 | 5/1970 | Fehring et al. | 244/102 |
| 4,155,522 | 5/1979 | Sealey | 244/102 |
| 4,199,119 | 4/1980 | Masclet | 244/102 SS |
| 4,720,063 | 1/1988 | James et al. | 244/102 R |

FOREIGN PATENT DOCUMENTS 0567900  7/1943  United Kingdom ................ 244/100

Primary Examiner—Sherman Basinger
Assistant Examiner—Linda L. Palomar
Attorney, Agent, or Firm—Glenn D. Bellamy

[57] ABSTRACT

The disclosed invention provides a main landing gear (12, 14, 16, 18) for a high speed (supersonic) aircraft (10) which may be wing-stowed and -mounted in a relatively thin wing (22, 24). The main landing gear (12, 14, 16, 18) is characterized by an inboard gear (12, 14) including a post (58) having a transverse trunnion (52) at a first end (56 or 54) operably mounted on the wing (22, 24). The trunnion (52) is journalled for rotation about an axis for movement of the post (58) between operative and stowed positions. This axis is substantially transverse to the body of the aircraft for forward rotation of the inboard gear (12, 14). A wheel assembly (78, 80) is operably attached at a second end of the post (58). The wheel assembly (78, 80) has a plane of rotation which when stowed in the wing (22, 24) is substantially vertical. In combination with the inboard gear (12, 14) is an outboard gear (16, 18) which includes a post (90) having a skewed trunnion (92) at a first end operably mounted on the wing (22, 24). The trunnion (92) is journalled for rotation about an axis for movement of the post (90) between operative and stowed positions. This axis is skewed relative to the body for obliquely forward and inboard retraction of the outboard gear (16, 18). A wheel assembly (118, 120) is attached at a second end of the post, having a plane of rotation which, when stowed in the wing (22, 24), is substantially horizontal.

20 Claims, 6 Drawing Sheets

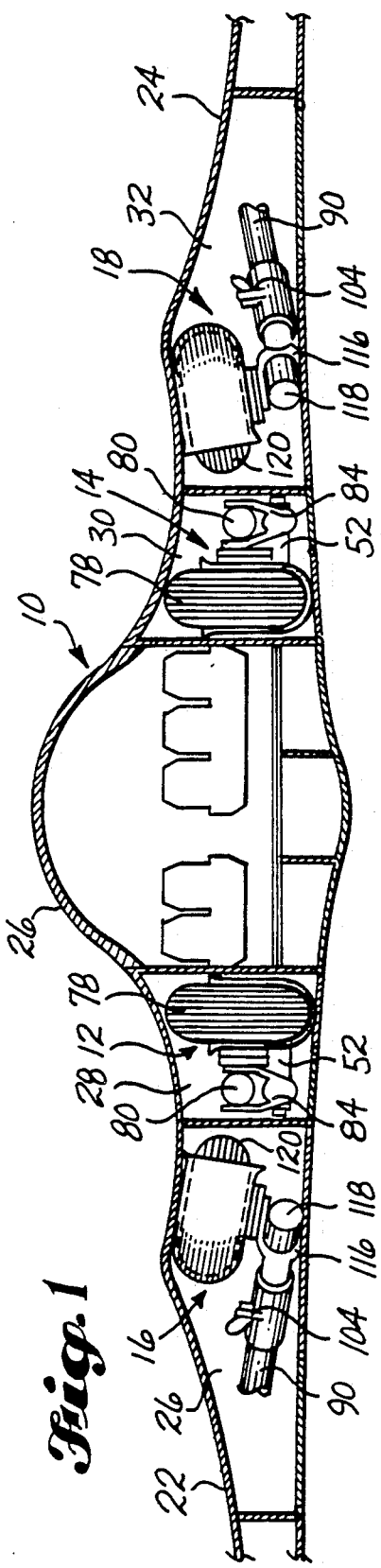
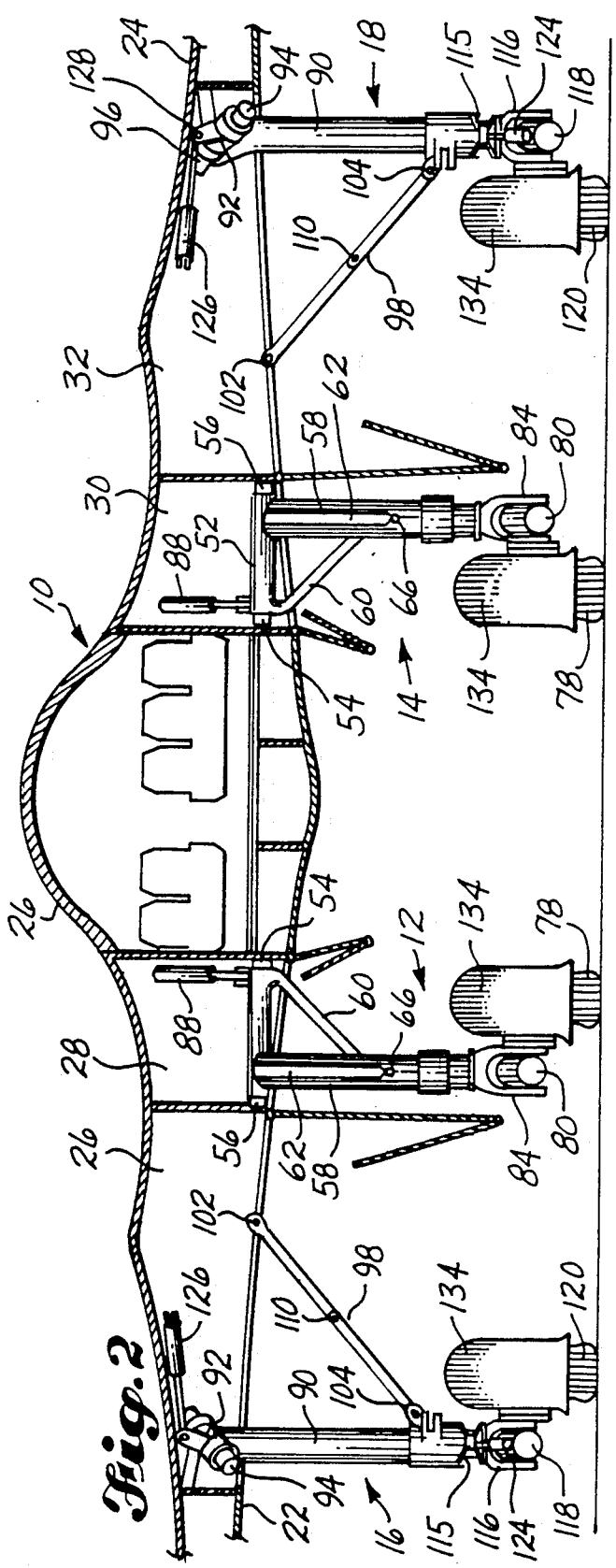

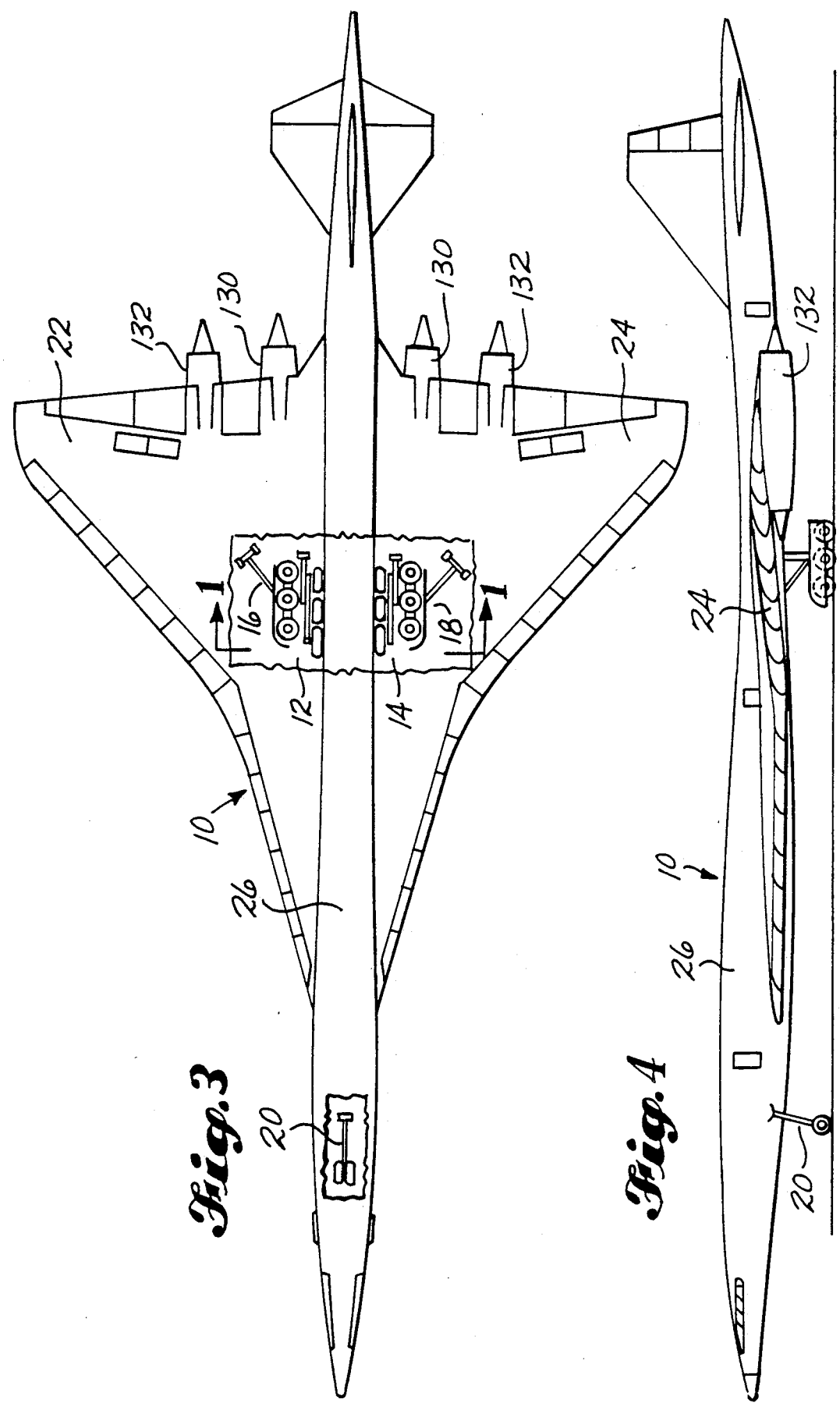

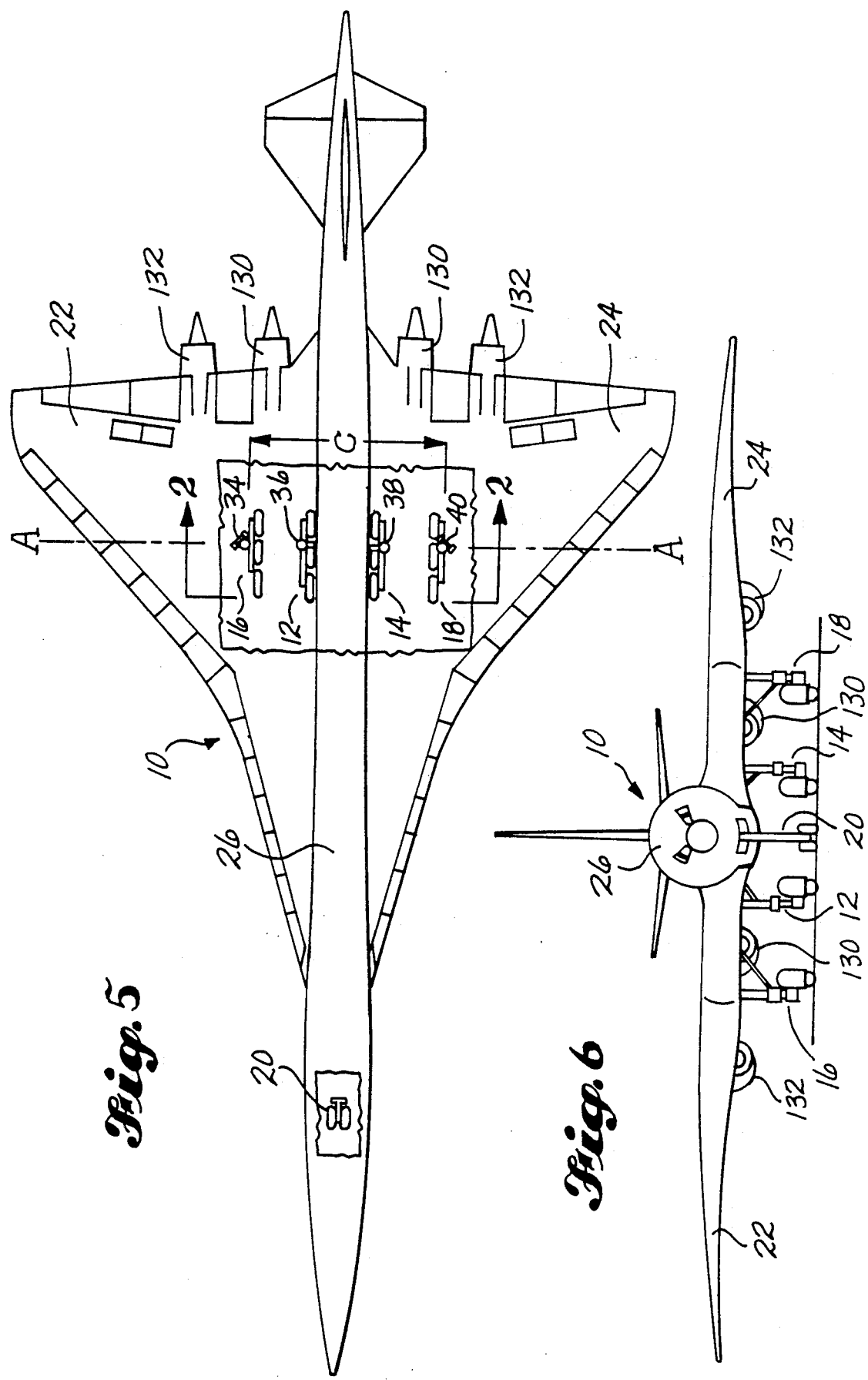

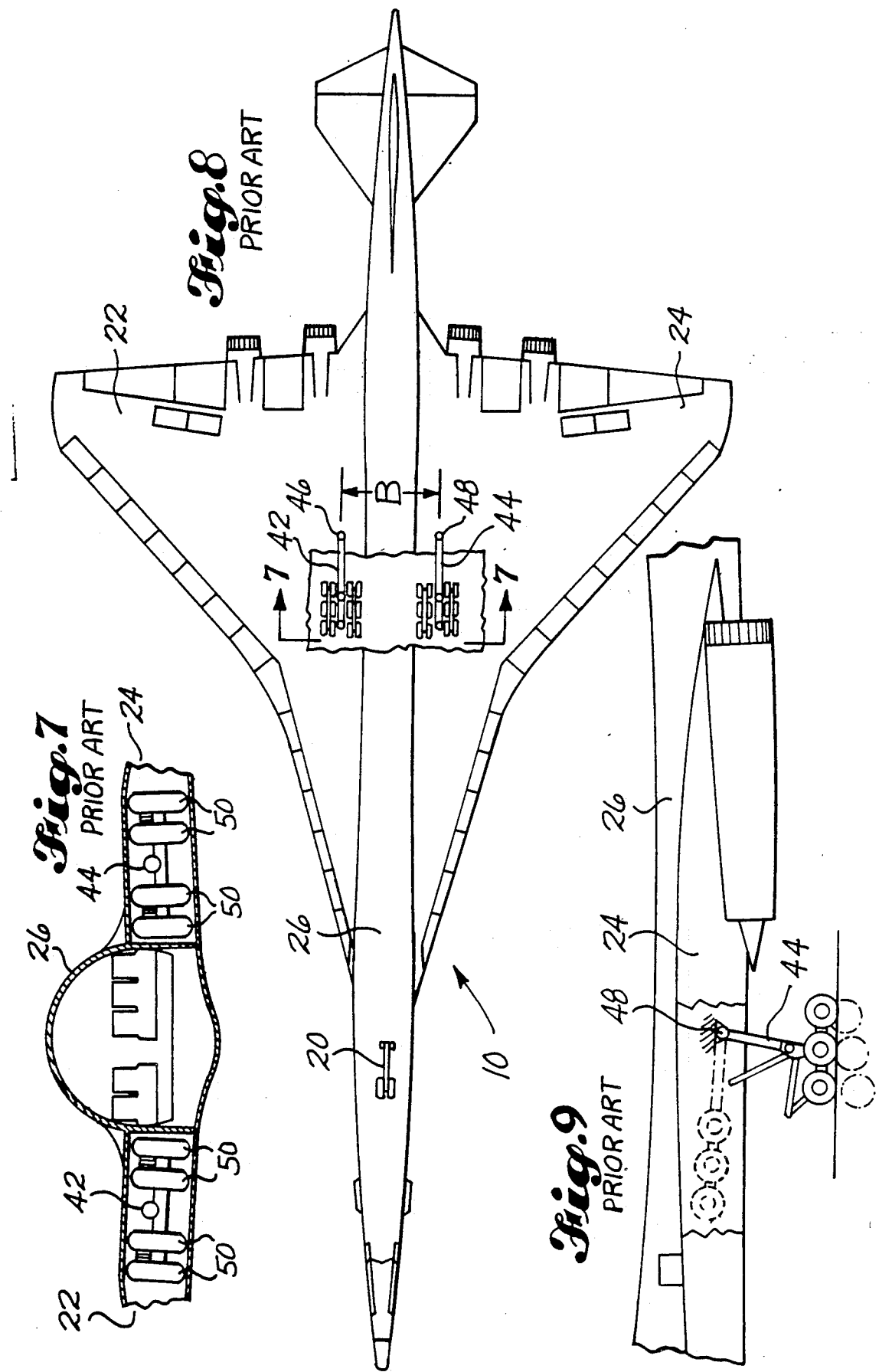

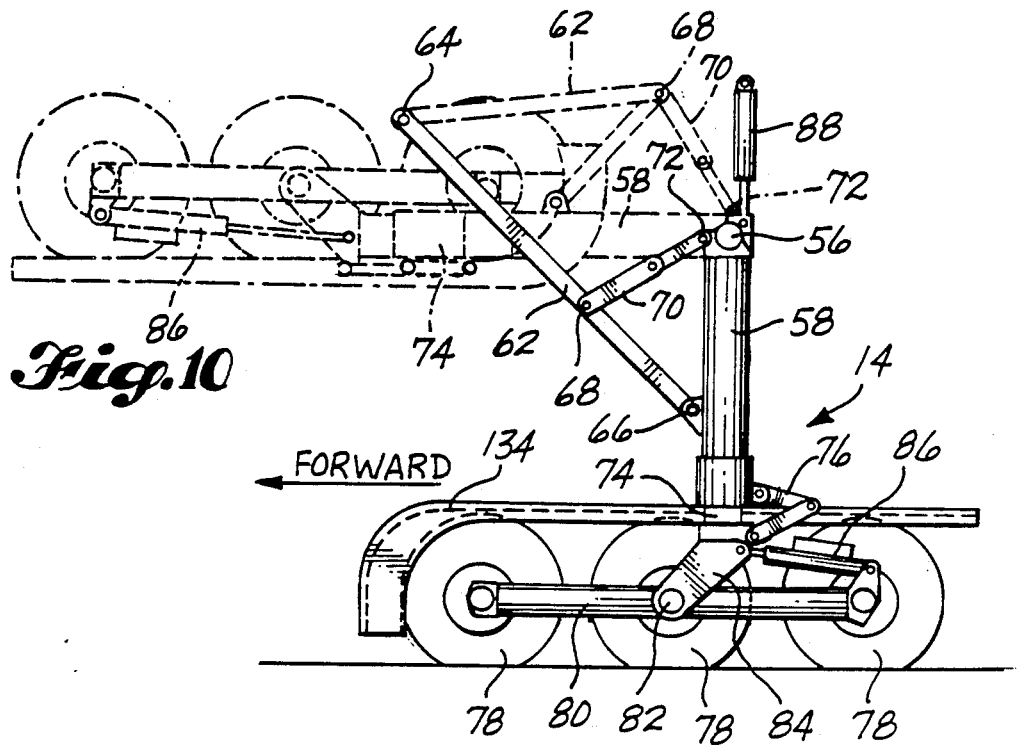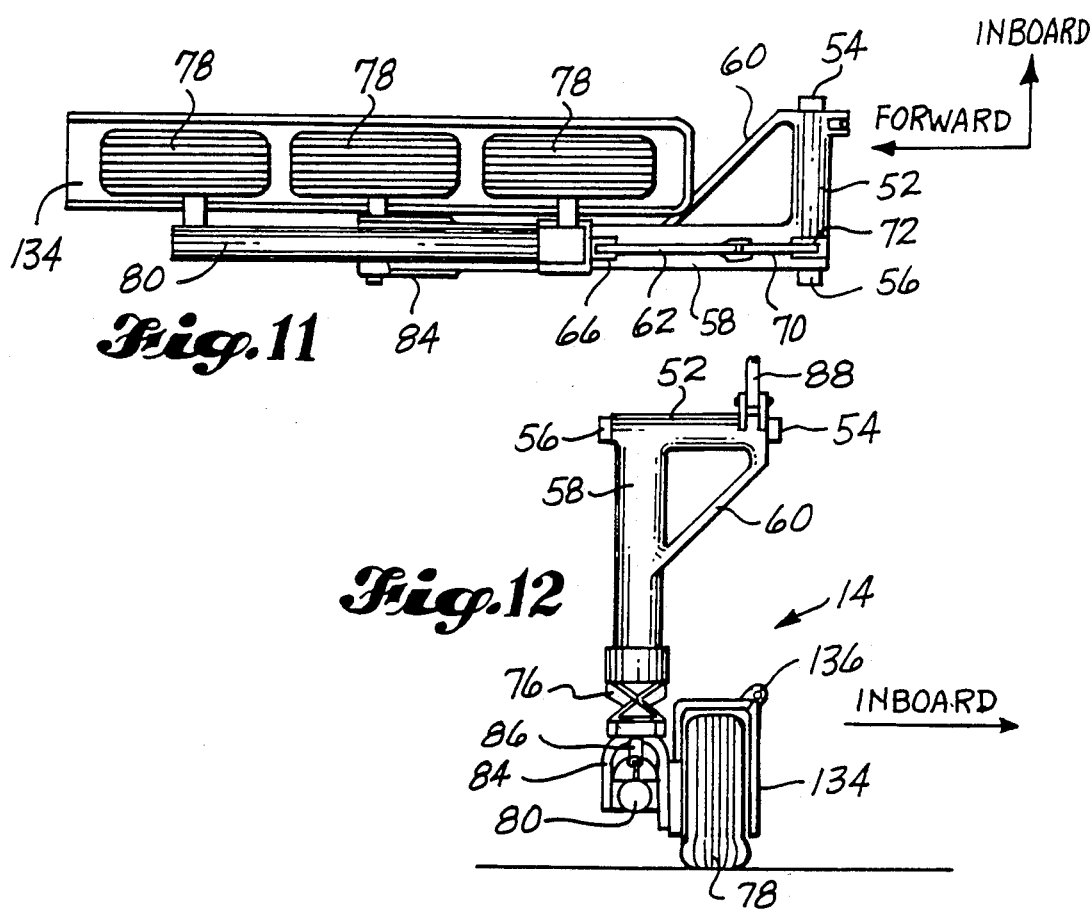

FOUR-POST WING-STOWED MAIN LANDING GEAR FOR HIGH SPEED AIRCRAFT

DESCRIPTION

1. Technical Field

This invention relates to a four-post main landing gear for a high speed (supersonic) aircraft. In particular, this invention provides a wing-mounted and stowed main landing gear with forwardly-retracting inboard posts and obliquely-retracting outboard posts.

2. Background Art

The design of a supersonic commercial transport aircraft manifests problems vastly different from those encountered in the design of its subsonic counterpart. A predominant difference is a reduced tolerance for error or approximation, precision and efficiency being absolutely necessary to an economically viable vehicle. The fuselage shape is defined primarily by wave-drag considerations, rendering the old simple-tube body ineffectual and its constant six- or seven-, or nine-abreast seating impossible. In order to make the production and use of a supersonic commercial transport aircraft economically feasible, it is necessary to increase both passenger load and range compared to older supersonic aircraft designs. One of the inevitable results of this is a general growth in all of the airplane weights, from operating empty weight to maximum gross weight. Present designs indicate an 850,000 pound airplane, a 34% increase compared to the 635,000 pound USA SST of 1965, or its 750,000 pound offspring design of 1978. While the weights have dramatically increased compared to previous designs, the overall physical structure size has not grown in proportion. One of the systems most seriously impacted by this increased weight is the landing gear.

Considerations included in the design of an aircraft's landing gear are flotation, loading, steering and braking, as well as maintenance, tip-up margin, and damage which may be caused by displacement of foreign objects or water spray from the runway. Additionally, the landing gear must be able to be stowed within the volume distribution of the supersonic airplane which is defined specifically according to its flight mission. Any change in this distribution significantly increases wave drag. Typically, the fuselage reduces in size (cross-section) near its mid-length, giving it a "waisted" or area-ruled look. Unfortunately, this region of minimum body area is inevitably coincident with the main gear location for such airplanes. In current designs, the fuselage has been reduced to the point that no body volume is available to house a stowed gear, forcing it to be stowed completely in the wing. Another seemingly opposed consideration requires that supersonic airplanes have thin wings for efficient flight. This requirement complicates the stowage of the landing gear within the wing.

Prior art landing gear for such supersonic airplanes have been characterized by two main load-carrying posts which retract directly forward. Each post carries two large trucks, each truck carrying six tires on three wheels in tandem. The trucks rotate on a transverse axis relative to the post when retracted to lie relatively flat in the wing with all tires in an upright position.

The previous solution to the wing thickness limitation was the use of many small diameter (42 inch) tires to allow a physically-thin wing at the landing gear location. Even so, the resulting thickness ratio (thickness/chord length) in the gear well region required compensatory airframe design. This limited efficient use of the prior art landing gear to gross weights of 700,000 pounds and less.

Growth of the airplane to greater weights, however, would cause the prior art gear to violate pavement loading limits, brake energy requirements, turning requirements, and tire pressure limits. Also, the retraction geometry of the prior art landing gear requires a 48 inch stroke, resulting in a very "soft" (low spring constant) landing gear. This, in turn, would significantly limit the speed at which turns could be safely made in order to avoid the possibility of rollover on turning. This risk was also caused in part by the relatively narrow stance or distance between the posts. The stance, however, could not be increased using the two-post design because of wing thickness ramifications which become increasingly serious at outboard locations on the wing. Shifting the posts outboard, and consequently the stowed position of the multi-wheeled trucks, would require that the wing include uncompensated bulges or that the wing have an unacceptable thickness over a wide area from the body outwardly beyond the gear.

In order to provide a cost-effective supersonic commercial transport aircraft having a gross weight of 800,000 to 900,000 pounds, a main landing gear is needed which acceptably distributed load on both wing and runway without increasing wing thickness and/or passenger cabin encroachment for gear stowage.

SUMMARY OF THE INVENTION

The present invention solves each of these problems within the above design criteria by providing a four-post main landing gear with separate inboard gear and outboard gear. The inboard gear includes a post having a transverse trunnion at a first end. The trunnion is journalled for rotation about an axis for movement of the post between operative and stowed positions. The axis is substantially transverse relative to the body of the aircraft for forward retraction of the inboard gear. A wheel assembly is operatively attached at a second end of the post. The wheel assembly has a plane of rotation and is stowed in the wing with the plane of rotation in a substantially vertical position. The outboard gear includes a post having a skewed trunnion at a first end. The skewed trunnion is journalled for rotation about an axis for movement of the post between operative and stowed positions. The axis is skewed relative to the body for obliquely forward and inboard retraction of the outboard gear. A wheel assembly is attached at a second end of the post. The wheel assembly has a plane of rotation and is stowed in the wing with the plane of rotation substantially horizontal.

According to one feature of the invention, the trunnions may be mounted to the aircraft wing at positions which load the wing substantially in a transverse line. Additionally, the wheel assemblies may include multi-wheel tandem trucks. The wheels may be mounted in a cantilevered fashion on a single side of the truck assembly to provide a relatively small width to the gear. The truck may be pivotally mounted to the post so that, in the case of the inboard gear, the truck rotates to a position substantially parallel to and above the post when in the stowed position. In the case of the outboard gear, the truck may rotate to be situated substantially parallel to the inboard truck and aircraft body.

The inboard gear may include a trunnion-mounted side brace such that both side and vertical loads are carried by the trunnion. The inboard gear may also include a folding drag brace.

According to another important aspect of the invention, the outboard gear is mounted in a tripod arrangement, having folding side and drag braces to carry side and drag loads, respectively, such that the post and relatively short, skewed trunnion carry only vertical loads.

The inboard and outboard gear may be situated transversely on the wing so as not to be directly forward of aft engine intakes. In this manner, the landing gear of the present invention may be located to both efficiently distribute load and to avoid unnecessary creation of turbulence forward of engine intakes.

Each wheel assembly may also include a fender covering forward, top, and/or side portions of the wheel assembly to deflect spray of water or displacement of foreign objects from the runway, to reduce the possibility of ingestion into engine intakes.

According to another important feature of the invention, the aircraft wing may include an inboard portion having a thickness sized to house the inboard gear and the outboard wheel assembly in a stowed position and then having a relatively thinner outboard portion to which the outboard trunnion is mounted and within which the outboard post is stowed. In this manner, the wing is permitted to be dimensioned thinner at a location more closely inboard than that allowed by prior art landing gear for similar aircraft.

Other features of the invention will become apparent by examination of the attached drawing figures, the detailed description of the best mode for carrying out the invention, and the appended claims.

BRIEF DESCRIPTION OF THE DRAWING

Like reference numerals are used to represent like parts throughout the various figures of the drawing, and wherein:

FIG. 1 is a partial cross-sectional view of a high speed civil transport aircraft showing the subject four-post landing gear in its stowed position, and taken substantially along line 1—1 of FIG. 3;

FIG. 2 is a partial cross-sectional view similar to that of FIG. 1, showing the gear in a deployed position and taken substantially along line 2—2 of FIG. 5;

FIG. 3 is a partially cut-away top view of such an aircraft showing the subject landing gear in a stowed position;

FIG. 4 is a side view showing the gear in a deployed position;

FIG. 5 is a partially cut-away top view showing the subject landing gear in a deployed position;

FIG. 6 is a front view of the aircraft showing the gear in the deployed position;

FIG. 7 is a fragmentary cross-sectional view of a similar aircraft showing prior art landing gear in a stowed position and taken substantially along line 7—7 of FIG. 8;

FIG. 8 is a partially cut-away top view of such an aircraft showing the prior art landing gear in a stowed position;

FIG. 9 is a partially out-away, fragmentary side view of the aircraft showing the deployed and stowed positions of the prior art landing gear;

FIG. 10 is a detail side view of the inboard landing gear of the present invention shown in relative deployed and stowed positions;

FIG. 11 is a top detail view of the inboard landing gear in a stowed position;

FIG. 12 is a rear detail view of the inboard landing gear in a deployed position;

BEST MODE FOR CARRYING OUT THE INVENTION

Figure 13:
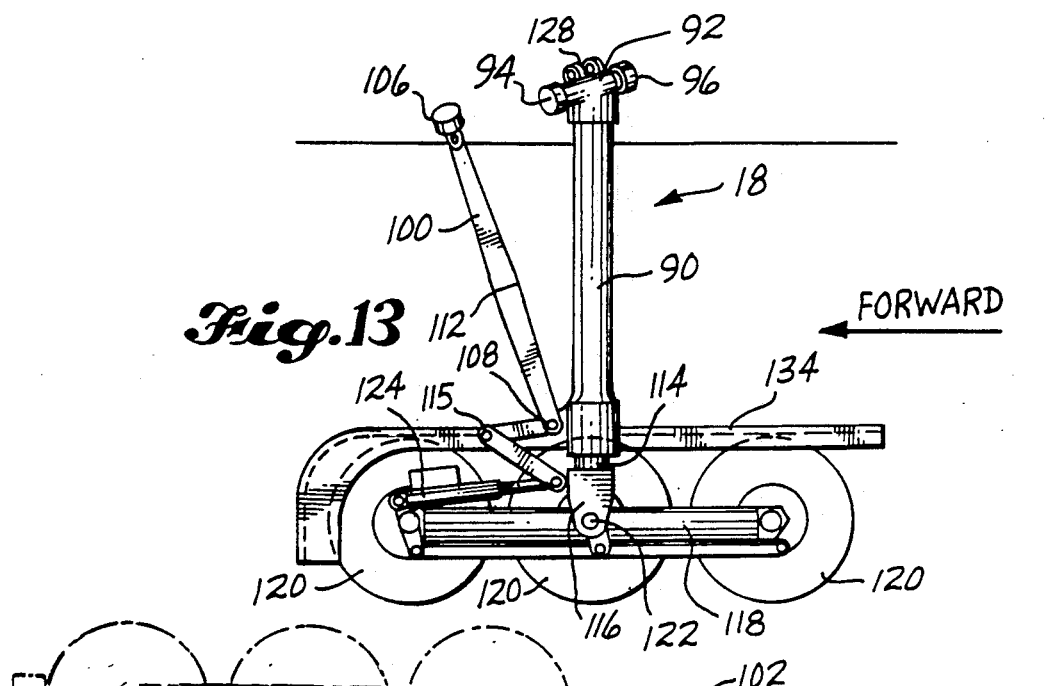
FIG. 13 is a detail side view of the outboard landing gear in a deployed position.

Referring to the various figures of the drawing, and first to FIGS. 1–6, therein is shown at 10 an aircraft of the type to which a landing gear according to this invention is particularly suited. The illustrated aircraft 10 is designed for high speed (supersonic) flight and includes an elongated body 26 and a pair of oppositely-extending wings 22, 24. The main landing gear 12, 14, 16, 18 is mounted on the wings 22, 24 and is adapted to be retracted into storage compartments 26, 28, 30, 32 in the wings 22, 24 when the aircraft 10 is airborne. On the ground, the aircraft 10 is also forwardly supported and steered by a nose-mounted landing gear 20 which is not the subject of the present invention.

One important characteristic of the disclosed main landing gear is that pairs of inboard and outboard gear may be mounted to the aircraft's wing 22, 24 at positions which load each wing 22, 24 substantially in a line transverse to the body 26 of the aircraft 10. This is best illustrated in FIG. 5 which shows a top view of such an aircraft 10 partially cut away to reveal the location of the main landing gear in an operative position. The load is distributed predominately to four points 34, 36, 38, 40 along line A—A. The gear 12, 14, 16, 18 may then be stowed in wings 22, 24, as generally shown in FIG. 3. This configuration allows the gear to be stowed at positions as closely inboard to the body 26 as possible and in such a way that the thickness of the wing 22, 24 may be decreased at a point more closely inboard compared to wings sized to have the prior art landing gear. The improved wing shape facilitated by the present landing gear configuration allows the supersonic cruise drag to be significantly decreased. At the same time, the landing gear of the present invention provides a wider weight distribution necessary for carrying gross weights of 800,000 to 900,000 pounds.

A prior art embodiment of main landing gear for a high speed commercial aircraft is shown in FIGS. 7–9. The prior art landing gear is was characterized by two main load-carrying posts 42, 44 which retract directly forward from the operative position shown in FIG. 9. This prior art gear distributes the load to the wings at two points 46, 48 and to the runway through twelve small diameter (42 inch) tires 50 per post. The "stance" of this prior art landing gear, indicated at B, is small relative to the wing span of the aircraft 10' and inadequate for the load distribution of gross weights in excess of the 635,000 to 750,000 pound gross weight for which it was designed. The stance, indicated at C, provided by the landing gear of the present invention is made possible by the combination of retraction modes used by the inboard and outboard gear, respectively. The four-post configuration also facilitates a broader distribution of weight to both the runway and wing.

The directly forward retraction of the prior art posts 46, 48 resulted in all of the tires 50 being stowed in an upright or vertical position. Because each post includes both inboard and outboard trucks, the wings 22, 24 were required to remain relatively thick at positions outboard of the body 26 in order to stow the vertically-positioned tires 50. This is best illustrated in FIG. 7 in which it is evident that moving the position of the posts 42, 44 or trucks to a more outboard position would require the thickened portion of the wings 22, 24 to be extended outboard as well to accommodate the tires 50 stowed in upright positions. As previously stated, the present invention provides the desired results without compromising the previously-designed wing thickness ratio.

INBOARD GEAR

Referring now in particular to FIGS. 1, 2, and 10-12, the inboard gear 12, 14 of the present invention includes a transversely-positioned trunnion 52 pivotally mounted at opposite ends 54, 56 to rotate about an axis which is substantially horizontal and transverse to the body 26 of the aircraft 10. Extending downwardly from the trunnion 52 is a main post 58 which includes an oleo strut. The post 58 is mounted adjacent the outboard end 56 of the trunnion 52 and a side brace 60 extends diagonally from the inboard end 54 of the trunnion 52 to a lower position on the main post 58. In this manner, the trunnion 52 bears both vertical and side loads placed on the inboard gear. Forward of the main post 58 is a folding drag brace 62 and extends from one end 64, secured to the wing 24, to a second end 66 which is pivotally secured to a lower position on the main post 58. The drag brace 62 is hinged at an intermediate position 68. The drag brace 62 is held in its operative position by a locking mechanism 70. The locking mechanism extends between the hinge point 68 of the drag brace 62 and a pivot point 72 which is adjacent to and rotates with the trunnion 52. The looking mechanism 70 is in its locked position when the drag brace 62 is in its fully deployed and fully stowed positions, as best shown in FIG. 10, and folds on itself to allow the drag brace 62 to fold as the gear 14 is moved to its stowed position.

The main post 58 includes a shock-absorbing oleo strut with a telescoping, extensible portion 74. In preferred form, the oleo has a stroke of approximately 24 inches. A folding torque linkage 76 of typical and well known construction extends between the extensible portion 74 and post 58. This linkage 76 transfers torque to the post 58 during turning of the aircraft 10.

The preferred embodiment includes a landing element in the form of a three-wheeled tandem truck. The truck includes three wheels 78 cantilevered on the inboard side of a truck beam 80. The truck beam 80 is centrally pivotally mounted 82 to a forwardly offset fork 84 on the extensible portion 74 of the post 58. In preferred form, the pivot axis 82 between the truck beam 80 and fork 84 is coincident with the axis of the central wheel 78. The truck beam 80 is pivotally positioned relative to the post 58 by a self-locking positioning cylinder 86.

For retraction, an actuation cylinder is attached to rotate the trunnion 52 and move the post 58 forwardly. As the post 58 is being moved forward, the truck-positioning cylinder 86 rotates the truck beam 80 from its position substantially perpendicular to the post 58, to a position in which the truck beam 80 is substantially parallel to and above the post 58 for stowage. This positioning is facilitated by the offset attachment of the fork 84. Also, because the wheels 78 are cantilevered to one side of the truck beam 80, the wheels 78 may be stowed in a position parallel to, but inboard from, the post 58. The folding drag brace 62 folds to a position above the post 58 and does not interfere with the position of the truck beam 80 or tandem wheels 78.

As shown in FIG. 1, in a stowed position, the wheels 78 are aligned in tandem, sharing a similar plane of rotation which is substantially vertical and immediately adjacent to and outboard of the passenger cabin in the body 26 of the aircraft 10.

OUTBOARD GEAR

Figure 14:
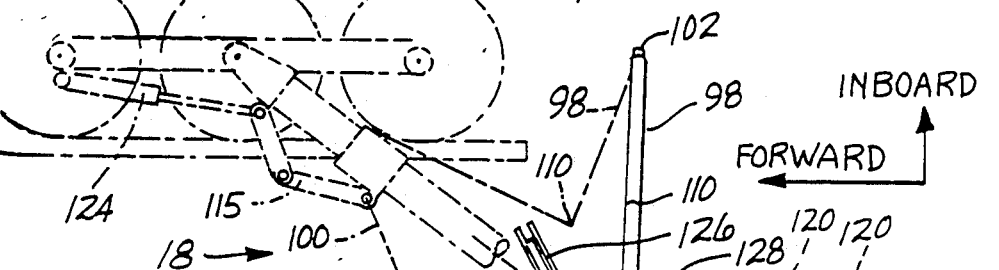
FIG. 14 is a top detail view of the outboard landing gear shown in relative deployed and stowed positions.
Figure 15:
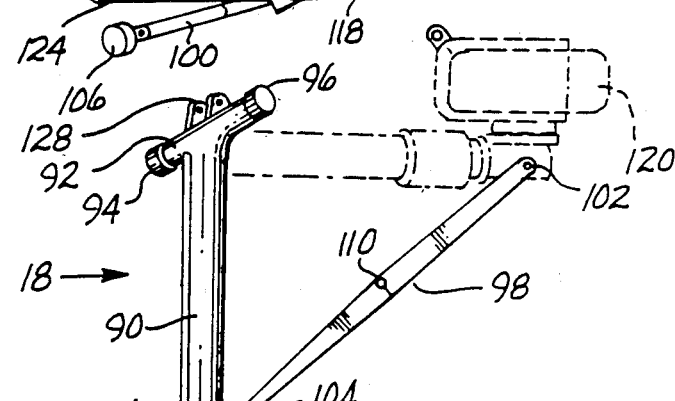
FIG. 15 is a rear detail view of the outboard landing gear shown in relative deployed and stowed positions.

Referring now in particular to FIGS. 1, 2, and 13-15, the outboard gear 16, 18 of the present invention includes a main post 90 having a skewed trunnion 92 at a first end. The trunnion 92 has opposite ends 94, 96 which are mounted to pivot about a skewed axis extending from a forward, outboard, lower position (94) to an aft, inboard, upper position (96). This axis of rotation is selected such that upon rotation of the trunnion 92, the post 90 will move between a substantially vertical operative position forwardly and inboard to a stowed position. The outboard gear 16, 18 also includes a side brace 98 and a drag brace 100. This tripod-type configuration allows the post 90 and trunnion 92 to bear only vertical loads, while side and drag loads are borne by the side brace 98 and drag brace 100, respectively.

A particular benefit of this tripod configuration is that the trunnion 92 can be kept relatively very short and therefore, skewed to the necessary extent without the necessity of adding external fairings to the wing 22, 24. The side brace 98 extends from a pivot point 102 which is inboard on the wing to a pivot point 104 at a lower position on the post 90. The drag brace 100 extends from a pivot point 106 which is forward on the wing 22, 24 downwardly to a pivot point 108 which is at a lower position on the forward side of the post 90. Both the side brace 98 and drag brace 100 have a fixed length when the gear 16, 18 is in its operative position and fold at central locations 110, 112 when the gear 16, 18 is stowed. The wing attachment points 102, 106 of the side brace 98 and drag brace 100, respectively, include universally rotating joints. In preferred form, this includes a pair of adjacent pivots having perpendicular axes of rotation. In this manner, each brace 98, 100 may rotate to allow forward movement of the post 90 upon retraction, as well as pivot to allow folding of each brace 98, 100.

An operative embodiment of the outboard gear could be made with a trunnion-mounted drag brace. The trunnion could be elongated such that the wing attachment point 106 of the drag brace 100 would be axially aligned with the trunnion of the post 90. Such a configuration may require external fairings to house the elongated trunnion which would cause this embodiment to be considered somewhat less desirable than the illustrated, preferred embodiment.

The post 90 includes a shock-absorbing oleo strut with a telescoping, extensible portion 114. In preferred form, this oleo also has a stroke of approximately 24 inches. A folding torque linkage 115 of typical and well-known construction extends between the extensible portion 114 and lower end of the post 90. This linkage 115 transfers torque to the post 90 during turning of the aircraft 10.

At the lower end of the post 90, attached to the extensible portion 114 is an attachment fork 116 to which a main truck beam 118 is pivotally attached. The truck beam 118 carries three single wheels 120 in tandem cantilevered axially onto its inboard side. In preferred form, the pivotal connection 122 between the truck beam 118 and fork 116 is co-axial with the central wheel 120. In a normal, operative position, the truck beam 118 is positioned substantially perpendicular to the post 90. The position of the truck beam 118 relative to the post 90 is controlled by a positioning actuator 124.

Actuation of the outboard gear 16, 18 is controlled by an actuating cylinder 126 which is pivotally attached 128 to the trunnion 92 of the post 90. The actuator 126 rotates the trunnion 92 and post 90 about its skewed retraction axis to move the post from its operative position in which it is substantially vertical, to a position within the wing 22, 24 in which the post 90 is substantially horizontal within the wing 22, 24.

Upon retraction of the post 90, the truck beam 118 is pivoted by the positioning actuator 124 to a slightly inclined position such that when the gear 16, 18 reaches its fully-stowed position, the wheels 120 and truck beam 118 are aligned substantially parallel to the body 26 of the aircraft 10 and substantially parallel to the truck of the inboard gear 12, 14. Additionally, this will position the wheels 120 such that their plane of rotation is substantially horizontal, or only slightly inclined therefrom, within the wing storage compartment 26, 32. This placement is best shown in FIG. 1. In this manner, the thickness of the wing 22, 24 in this area may be maintained at a minimum. The wheels 120 and truck beam 118 representing the thickest (widest) portion of the outboard gear 16, 18 is stowed in a position as far inboard as possible. The relatively thinner post 90 and short trunnion 92 are stowed outboard of the truck allowing both the wing 22, 24 to be thinned at a position more inboard than that permitted by the prior art and allowing the loading characteristics of the main gear 12, 14, 16, 18 to be positioned at points further outboard (i.e., a wider stance) on the wings 22, 24.

Referring now also to FIGS. 5 and 6, this two-post per wing configuration of inboard and outboard gear causes the gear in its operative position to be staggered relative to the aft wing-mounted inboard and outboard engines 130, 132. In this manner, unnecessary air turbulence directly forward of engine 130, 132 inlets is avoided.

In preferred form, each truck includes a fender 134 which extends over the forward and top sides of the tandem wheels 78, 120. The fenders 134 may also be made to extend downwardly to cover opposite sides of the wheels 78, 120. In this case, the fenders 134 would be hinged 136 to provide easy access to the wheels 78, 120 for servicing. The fenders 134 are preferably made from a lightweight, self-supporting composite material such as a fiber-reinforced plastic. Such fenders 134 do not add significant size or weight to the tandem trucks, thereby not complicating stowage. The fenders 134 serve to deflect spray and displacement of foreign objects from the runway to reduce the possibility of foreign object ingestion into the intake of the engines 130, 132.

The disclosed and illustrated embodiment represents the presently best-known mode for carrying out the invention. Therefore, these are not to be construed as limitive, but rather exemplary. Many changes could be made in the use of this invention as necessary to serve a particular application without departing from the spirit and scope of this invention. Therefore, patent rights are to be determined by the limitations of the following claim or claims interpreted according to accepted doctrines of claim interpretation, including the doctrine of equivalents.

What is claimed is:

1. In an aircraft having a body and a wing, retractable main landing gear, comprising:

an inboard gear including:

a post having a transverse trunnion at a first end operably mounted on said wing, said trunnion journalled for rotation about an axis for movement of said post between operative and stowed positions, said axis being substantially transverse relative to said body for forward retraction of said inboard gear, and a wheel assembly operably attached at a second end of said post, said wheel assembly having a plane of rotation and being stowed in said wing with said plane of rotation substantially vertical; and an outboard gear including:

a post having a skewed trunnion at a first end operably mounted on said wing, said trunnion journalled for rotation about an axis for movement of said post between operative and stowed positions, said axis being skewed relative to said body for obliquely forward and inboard retraction of said outboard gear, and a wheel assembly attached at a second end of said post, said wheel assembly having a plane of rotation and being stowed in said wing with said plane of rotation substantially horizontal.

2. The landing gear of claim 1, wherein said trunnions are mounted to said wing at positions to load said wing substantially in a line transverse to said body.

3. The landing gear of claim 1, wherein each said wheel assembly includes a plurality of wheels in tandem, said wheels of each assembly having separate axes of rotation and a substantially congruent plane of rotation.

4. The landing gear of claim 3, wherein said plurality of wheels of each wheel assembly is mounted on a truck assembly, said truck assembly being pivotally attached to said second end of said post for relative movement thereto.

5. The landing gear of claim 3, wherein each said wheel assembly includes a truck assembly, said plurality of wheels being mounted in tandem on a single side of said truck assembly.

6. The landing gear of claim 5, wherein said wheel assembly includes three wheels, said truck assembly being pivotally attached to said post with said pivot being substantially co-axial with the axis of rotation of a center one of said three wheels.

7. The landing gear of claim 3, wherein said wheel assembly further includes a fender having portions covering forward and top sides of said wheel assembly.

8. The landing gear of claim 1, wherein said inboard gear includes a side brace extending between an inboard end of said trunnion and said post.

9. The landing gear of claim 8, wherein said inboard gear further includes a drag brace positioned between a point on said wing forward of said trunnion and said post, said drag brace being hinged to fold at a intermediate location for stowage of said inboard gear.

10. The landing gear of claim 1, wherein outboard gear includes a side brace and a drag brace operatively extending between separate locations on said wing to said post to carry side and drag loads, respectively.

11. The landing gear of claim 10, wherein said side and drag braces each are hinged at intermediate locations such that said braces will fold to facilitate movement of said post between operative and stowed positions.

12. The landing gear of claim 11, wherein said inboard gear includes a side brace extending between an inboard end of said trunnion and said post.

13. The landing gear of claim 12, wherein said inboard gear further includes a drag brace positioned between a point on said wing forward of said trunnion and said post, said drag brace being hinged to fold at a intermediate location for stowage of said inboard gear.

14. The landing gear of claim 1, wherein said wing includes an inboard portion having a thickness sized to house said inboard gear and said outboard wheel assembly in a stowed position and said wing having a relatively thinner outboard portion to which said outboard trunnion is mounted and within which said outboard post is stowed.

15. The landing gear of claim 14, wherein said inboard gear is stowed in said wing adjacent said body and said wheel assembly of said outboard gear being stowed outboard and adjacent to said inboard gear.

16. The landing gear of claim 1, wherein each said wheel assembly is operatively cantilevered for rotation inboard of each said post.

17. The landing gear of claim 1, wherein said inboard gear includes a wheel assembly having a plurality of wheels operatively mounted in tandem on a truck assembly, said truck assembly being pivotally mounted to said post for relative movement thereto, and said truck assembly pivoting relative to said post upon retraction of said inboard gear such that said truck assembly is stowed relatively above said inboard post.

18. The landing gear of claim 1, wherein said inboard and outboard gear in said operative position are transversely spaced at positions offset from an engine intake on said wing aft of said landing gear.

19. The landing gear of claim 1, wherein each said wheel assembly includes a fender operatively positioned to cover forward and top portions of said wheel assembly.

20. The landing gear of claim 19, wherein said fenders further include a side positioned to cover a side portion of said wheel assembly, said side being movable to a position to facilitate servicing of said wheel assembly.

* * * * *

UNITED STATES PATENT AND TRADEMARK OFFICE
CERTIFICATE OF CORRECTION

PATENT NO. : 5,000,400

DATED : March 19, 1991

INVENTOR(S) : V. Kenneth Stuhr

It is certified that error appears in the above-identified patent and that said Letters Patent is hereby corrected as shown below:

On the title page, under "U.S. PATENT DOCUMENTS", the following patents should be listed:

| | | | |
|---|---|---|---|
| 3,038,687 | 6/1962 | Hartel | 244/102 |
| 3,086,733 | 4/1963 | Hartel | 244/102 |
| 3,171,619 | 3/1965 | Alesbury | 244/102 |
| 3,188,026 | 6/1965 | Perdue et al | 244/102 |
| 3,488,020 | 1/1970 | Scherer | 244/50 |
| 3,687,400 | 8/1972 | Fitzgerald et al | 244/102 |
| 3,991,957 | 11/1976 | Neumann | 244/102 |
| 4,389,029 | 6/1983 | Glasenapp et al | 244/103 |

Column 3, line 63, "out-away" should be --cut-away--.

Column 5, line 39, "looking" should be --locking--.

Signed and Sealed this

Twenty-second Day of September, 1992

Attest:

DOUGLAS B. COMER

Attesting Officer     Acting Commissioner of Patents and Trademarks